No. 816,593. PATENTED APR. 3, 1906.
D. O. PAIGE.
APPARATUS FOR USE IN PERFORATING THE FLANGES OF TANK SECTIONS.
APPLICATION FILED FEB. 24, 1905.

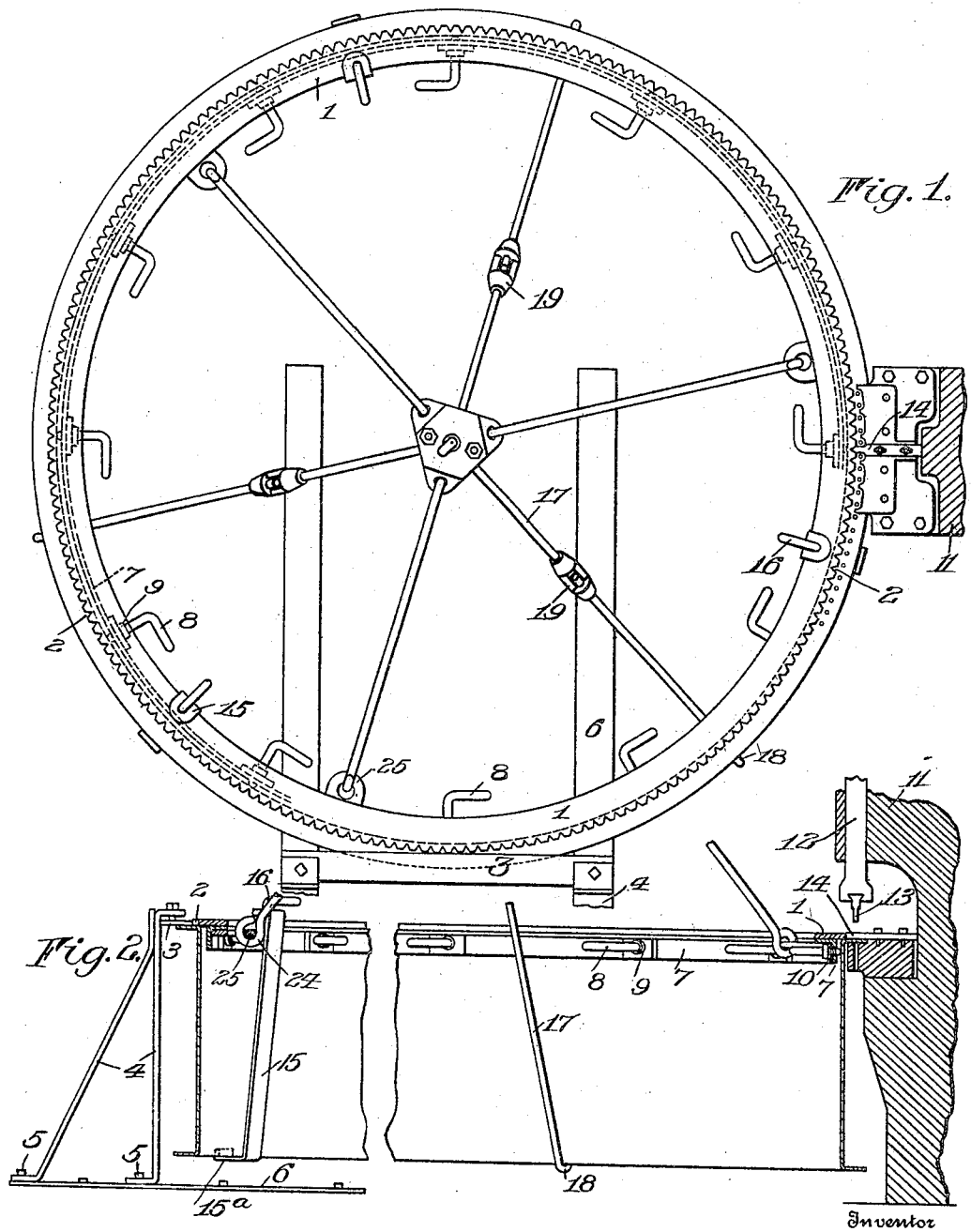

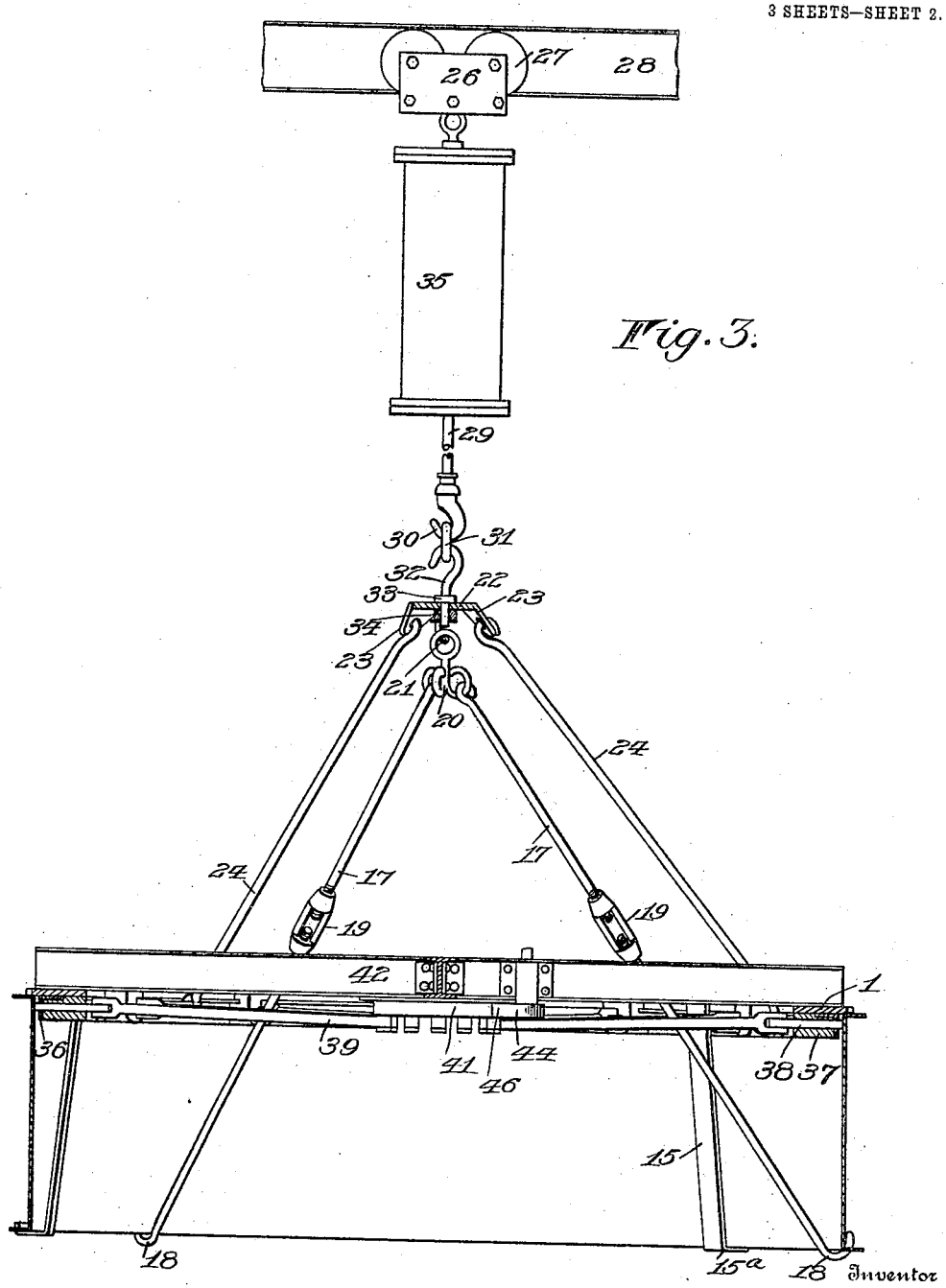

3 SHEETS—SHEET 3.

UNITED STATES PATENT OFFICE.

DAVID O. PAIGE, OF DETROIT, MICHIGAN, ASSIGNOR TO THE PFAUDLER COMPANY, OF ROCHESTER, NEW YORK, A CORPORATION OF NEW YORK.

APPARATUS FOR USE IN PERFORATING THE FLANGES OF TANK-SECTIONS.

No. 816,593.      Specification of Letters Patent.      Patented April 3, 1906.

Application filed February 24, 1905. Serial No. 247,121.

*To all whom it may concern:*

Be it known that I, DAVID O. PAIGE, of Detroit, in the county of Wayne and State of Michigan, have invented certain new and useful Improvements in Apparatus for Use in Perforating the Flanges of Tank-Sections; and I do hereby declare the following to be a full, clear, and exact description of the same, reference being had to the accompanying drawings, forming a part of this specification, and to the reference-numerals marked thereon.

My present invention relates to improvements in apparatus for rendering the operation of perforating the flanges of tank-sections and other annular sheet-metal bodies more convenient and accurate; and the purpose of my invention is to provide an apparatus of this kind which is particularly adapted for use in supporting tank-sections or other annular bodies, which are usually massive and inconvenient to handle, in operative position relatively to the punch or other perforating mechanism that may be employed and which is provided with devices for bringing the sheet-metal body into proper shape and passing it through the perforating device in such a way that the perforations will be accurately arranged around the flange.

To these and other ends the invention consists in certain improvements and combinations of parts, all as will be hereinafter more fully described, the novel features being pointed out in the claims at the end of the specification.

Figure 4:
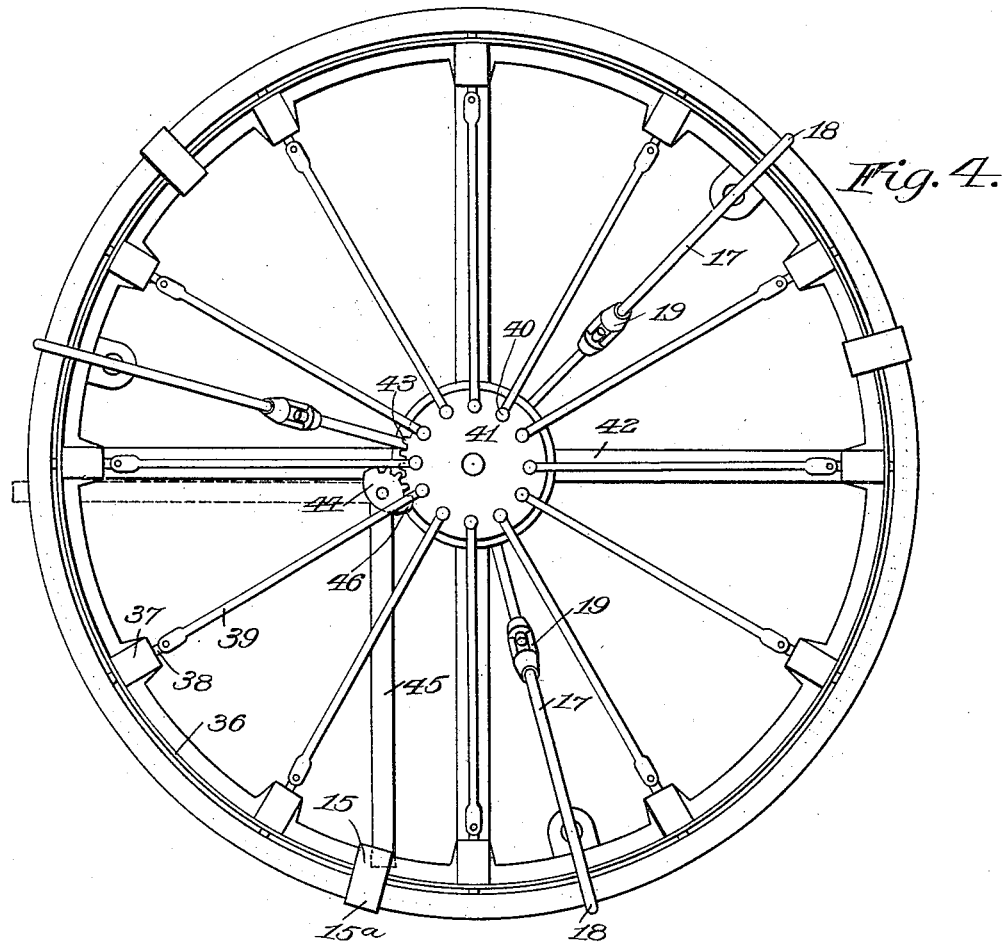
Figure 5:
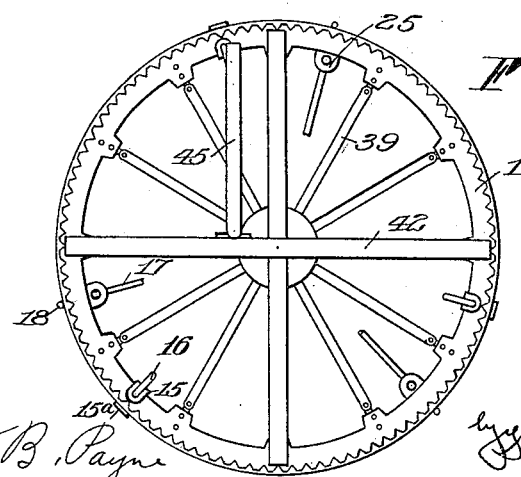

In the drawings, Figure 1 is a plan view of an apparatus of this kind constructed in accordance with my invention. Fig. 2 is a sectional view of the device shown in Fig. 1, parts being omitted. Fig. 3 is an elevation, partly in section, showing a different form of apparatus; and Figs. 4 and 5 are plan views of the device shown in Fig. 3 looking from the bottom and from the top thereof.

The same numerals of reference designate the same parts in the several views.

In the manufacture of tanks and other large hollow vessels of sheet metal they are usually made up of a plurality of ring-like sections, which are provided with flanges, through which bolts or other securing devices are passed for securing them together; and the object of my invention is to provide an apparatus for bringing each of the partially-completed sections, which are more or less imperfectly shaped, into proper form, so as to conform with a standard contour before they are passed through the punch or other perforating mechanism, and also to provide suitable devices for insuring accuracy during the perforating operation, so that the apertures of the flanges of the various sections will be arranged to register universally and accurately.

I have shown two methods of truing up the annular bodies, each form employed comprising, generally, a templet 1, which in the present instance is annular in form and substantially flat and of sufficient thicknesss to give it the requisite rigidity. This templet is provided with a series of peripheral notches 2, which are preferably V-shaped and correspond in number to the number of apertures that are to be formed in the flange of the sheet-metal section, the periphery of the templet being turned true and adapted to bear against the guide 3, while the section is being operated upon by the perforating device to retain the section properly centered, the said guide being supported on the uprights 4, the latter being secured by the bolts 5 in different adjusted positions on the ways 6 in order to accommodate templets and sections of differing diameters.

In that form of my invention shown in Figs. 1 and 2 an annular angle-iron 7 of sufficient diameter to enter within the sides of the tank-sections is attached to the under side of the templet 1, and this angle-iron is provided at predetermined intervals with the radially-extending clamping-screws 8, the outer ends of which are adapted to bear upon the adjacent walls of the tank-section as they are tightened to draw the section into a given shape, a shoulder 9 being preferably employed on each clamping-screw to engage a relatively fixed shoulder 10 of the angle-iron 7 to permit each clamping-screw to be tightened only a predetermined degree, the parts being so adjusted and proportioned that when all of the clamping-screws have been fully tightened the annular sheet-metal body will be accurately trued to insure accuracy during the perforating operation.

It will be understood that a perforating-machine of any suitable form may be employed for perforating the flanges of the sections, a punching-machine 11 being employed in the present instance having a plunger 12, which carries, preferably, a plurality of punches or dies 13, the latter being arranged in an arc concentric with the center of the templet when the latter is in operative position relatively to the punching device 11 and the guide 3, a centering device 14 being provided having a V-shaped end to engage in the correspondingly-shaped notches in the periphery of the templet to center the latter, and consequently the annular section, in operative position relatively to the dies 13 of the punching device.

In carrying my invention into practice the templet 1 is firmly secured to the upper flange of the annular section by clamps 15, which are applied at suitable intervals around the templet and are provided at their lower ends with a stirrup 15$^a$ to engage beneath the opposite edge of the section, and these clamps are provided at their upper ends with the clamping-screws 16, which are arranged to bear upon the templet when operated to draw the latter and the section firmly together.

In order to conveniently lift the annular section into operative position beneath the templet and support it in such a position while the clamps are being applied, I employ the bars 17, which are provided at their lower ends with hooks 18 to engage beneath the lower edge of the section, and on these rods are provided turnbuckles or other adjusting devices 19, which may be operated to elevate the section in order that it may be brought into proper position beneath the templet, the upper ends of these rods 17 being supported by the rings of the hook 20, which is suspended from a yoke 21, attached to the swivel-plate 22. This plate 22 is provided with the apertured lugs 23 to receive the upper ends of the supporting-bars 24, and these bars 24 are attached at their lower ends to the eyes 25, which are secured to the templet, and consequently the latter will be supported independently of the annular section, which is suspended by the bars 17, and therefore the position of the said section may be adjusted by operation of the adjusting devices 19, while the templet is supported in a relatively fixed position by the bars 24, the clamps 14 being then applied and the clamping-screws 16 adjusted until the section and the templet are firmly clamped in fixed relation.

Instead of employing the separately-operated clamping-screws 8 for truing up the annular section, so as to correspond with the templet the truing device (shown in Figs. 3, 4, and 5) may be employed, wherein a ring 36, provided with a plurality of suitably-spaced radially-arranged guideways 37 is secured to the under side of the templet 1, and in each of these guideways are mounted the plungers 38, the outer ends of which are arranged to engage the inner surface of the annular sheet-metal section at points slightly below the flange thereof, the inner ends of the plungers being pivotally connected to the operating-rods 39, which in turn are connected to the crank-pins 40 of a rotatable plate 41. This plate 41 is revolubly supported on a frame 42, rigidly secured to the templet, and it is provided with the gear-teeth 43, with which the pinion 44, supported by the frame 42 and carrying the operating-arm 45, coöperates. When the annular section is being applied to the templet, the operating-arm 45 will occupy a position similar to that shown in dotted lines in Fig. 4, the table 41 at this time being rotated, so as to draw the plungers 38 inwardly, and when the templet and the section are in proper relation the operating-arm 45 is moved into the position shown in full lines in Fig. 4, and this will cause the plate 41 to be rotated, operating the rods 39 to simultaneously move all of the plungers 38 outwardly into engagement at given intervals with the inner walls of the annular section, causing the latter to be drawn into the proper shape, the rotatable plate 41 being locked from movement in the reverse direction to prevent unlocking of the plungers by the stop 46, which is provided on the pinion 44 and arranged to engage the periphery of the plate 41 after the latter has been rotated sufficiently to carry the crank-pins across the line connecting the center of motion of the said plate and the respective points of attachment of the rods 39 and the plungers 38.

Any suitable hoisting device may be employed for supporting the templet and the annular section and for carrying these parts into and out of operative position relatively to the perforating device, that shown in Fig. 3 comprising a fluid-pressure cylinder 35, suspended from a carriage 26, the latter being provided with rollers 27, which are capable of traveling along a track 28, this track being extended into proximity to the punching device. Within the cylinder 35 is provided a piston 29, carrying a hook 30, connected by the ring 31 to the hook 32, and this hook 32 is pivotally connected to the swivel-plate 22 by the bolt 33 and nut 34, thereby forming a swivel connection between the hoist and the plate 22, which will enable the parts which are suspended therefrom to be freely rotated independently of the hoist.

While the annular section is firmly clamped to the templet and is securely held in its proper shape either by means of the truing devices shown in Figs. 1 and 2 or those shown in Figs. 3 to 5, inclusive, the parts are brought before the punch while suspended from the hoist, and with the periphery of the templet in engagement with the guide 3, which has been previously positioned properly, the notches 2 in the templet are successively brought into engagement with the relatively fixed centering device 14. The plunger 12 carrying the dies 13 of the punch may be operated successively each time a different portion of the flange of the annular section is properly centered in operative position, and as the parts are rotated bodily to bring the different portions of the flange into operative position the swivel connection between the suspended parts of the apparatus and the crane serves as a turn-table to permit these parts to be easily rotated independently of the hoist or other support.

In operating upon annular sections whose diameters differ it would be necessary to adjust the guide 3 in each case so that the center of the templet, and consequently of the flange of the annular section, will occupy a given position relatively to the punch to enable the apertures to be accurately formed in the flange, and for this purpose the standards 4, which support the guide, are capable of being shifted along the ways 6 and secured in such positions thereon that the centers of the different-sized templets employed will occupy the proper position relatively to the perforating device.

An apparatus of the kind above described is particularly useful in handling sections of tanks and other annular bodies of a similar nature which are usually massive and unwieldy, and by securing the section to a templet and swinging the whole about a pivot the section may be easily rotated into the various operative positions relatively to the perforating device, and by employing the guide which coöperates with the templet the perforations will be formed accurately and uniformly in all of the sections.

I claim as my invention—

1. In an apparatus for positioning tank-sections and analogous bodies during punching and similar operations, the combination with the punching device, of a support, a templet revolubly carried by the support and adapted to retain the section in proper shape while being operated upon, and a guide arranged to coöperate with the templet and center the latter and the section in operative position relatively to the punching device.

2. The combination with a punch, and a work-support, of an annular templet sustained by the support and secured in fixed relation to the work to be operated upon, of coöperatively-arranged centering devices engaging concentric portions of the templet at different points of its circumference for maintaining a fixed axis for the templet and the work during the punching operation.

3. The combination with a punch or other tool, a support for the work, a templet adapted to be secured in fixed relation to the work, and having a series of concentrically-arranged notches thereon and means for suspending the templet and work from said support, of coöperatively-arranged centering and positioning devices adapted to engage the templet at different points of its circumference to maintain a given axis therefor relatively to the tool, one of said devices having a part adapted to coöperate with the notches of the templet to rotatably position it relatively to the tool.

4. The combination with the operating-tool, of a templet adapted to receive a hollow annular body, and devices on the templet for drawing the said body into proper shape relatively to the templet.

5. The combination with the operating-tool, of an annular templet adapted to receive a correspondingly-shaped hollow body, and adjustable devices arranged to coöperate with the inner surfaces of the said body at suitable intervals for drawing the said body into a given shape relatively to the templet preparatory to being operated on by the tool.

6. The combination with the operating-tool, of an annular templet adapted to receive a correspondingly-shaped hollow body, and a plurality of radially-movable devices adapted to be moved outwardly to coöperate with the inner surfaces of the body at suitable intervals for causing the latter to conform to a given configuration.

7. The combination with the operating-tool, of an annular templet adapted to receive a correspondingly-shaped hollow body, devices arranged at suitable intervals around the templet and adapted to move outwardly and coöperate with the body causing the latter to conform to a given configuration, and means for simultaneously operating the said devices.

8. The combination with the operating-tool, of an annular templet adapted to receive a correspondingly-shaped hollow body, devices arranged at suitable intervals around the templet and adapted to coöperate with the body for causing the latter to conform to a given configuration, operating-rods connected to said devices, and a rotatable plate operatively connected to the operating-rods for simultaneously operating the said devices.

9. The combination with the operating-tool, of an annular templet adapted to receive a correspondingly-shaped body, devices thereon arranged to coöperate with the body for causing the latter to conform to a given configuration, and a guide arranged to coöperate with the templet to center the latter and the body relatively to the tool.

10. The combination with the operating-tool, of an annular templet adapted to receive a correspondingly-shaped body, devices thereon arranged to coöperate with the body for causing the latter to conform to a given configuration, a guide arranged to coöperate with the templet to center the latter and the body relatively to the tool, and means for adjusting the guide to accommodate bodies of different diameters.

11. The combination with the operating-tool, of an annular templet adapted to receive a correspondingly-shaped flanged body and having a series of notches formed thereon, a stop arranged to coöperate with the notches of said templet for positioning the latter and the flange of the annular body relatively to the operating-tool, and a guide adjustable to correspond with templets of different diameters, and arranged to coöperate with the templet and center the said body relatively to the tool.

12. The combination with the punching-machine having a plurality of dies arranged in an arc of a predetermined radius, of an annular templet adapted to be applied to a correspondingly-shaped flanged body which is to receive an annular row of perforations, said row to have a radius equal to the radius of the arc of the dies, and a guide coöperating with a concentric surface on the templet for retaining the templet and the said body centered relatively to the dies of the tool.

13. The combination with the operating-tool, of a templet adapted to receive an annular body, a support for the templet, and devices for causing the body to conform to a given configuration relatively to the templet, and for securing the templet and body in fixed relation while being operated on by the tool.

14. The combination with the operating-tool, of a templet adapted to receive an annular body, devices on the templet for causing the body to conform to a given configuration, and clamps for securing the templet and body in fixed relation.

15. The combination with the operating-tool, of a templet adapted to receive an annular body, a support by means of which the templet is revolubly supported, devices for revolubly supporting the said body, devices on the templet for causing the said body to conform to a given configuration, and clamping devices for securing the templet and body in fixed relation while the latter is being operated on by the said tool.

DAVID O. PAIGE.

Witnesses:
CLARENCE A. BATEMAN,
G. WILLARD RICH.